Sept. 2, 1952 D. ST. JOHN 2,608,763
METHOD AND APPARATUS FOR PHOTOGRAMMETRICALLY
CONSTRUCTING TOPOGRAPHICAL MAPS
Filed Sept. 3, 1946 4 Sheets-Sheet 2

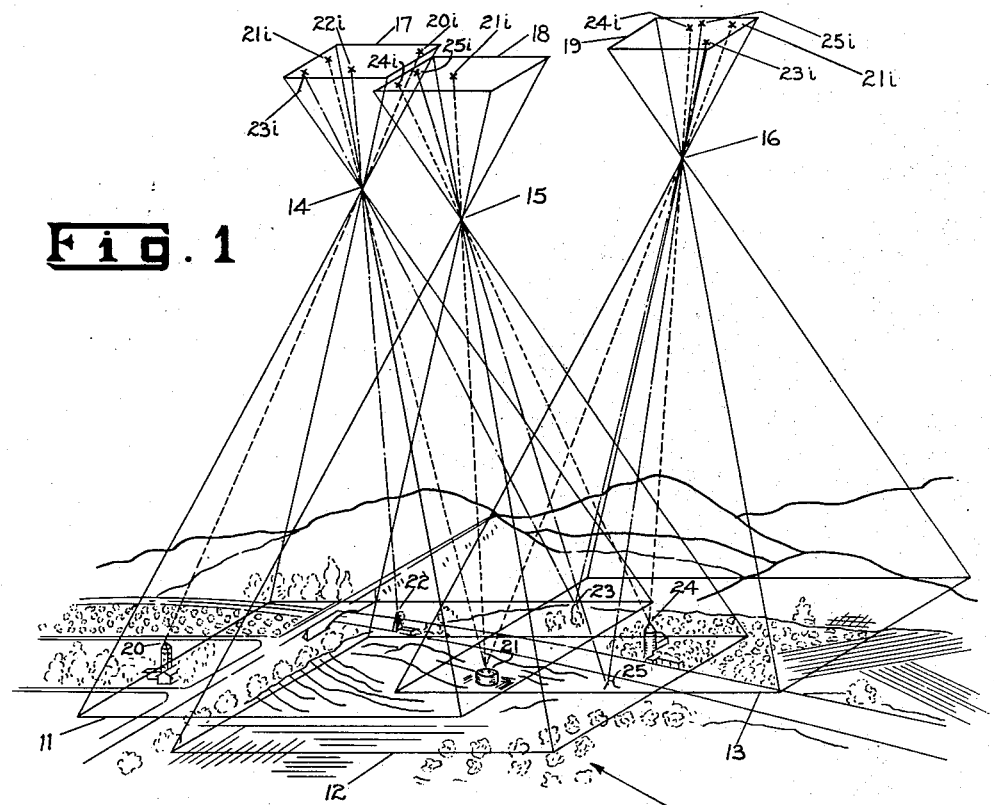

DUDLEY ST. JOHN
INVENTOR.

BY
ATTORNEYS

Sept. 2, 1952    D. ST. JOHN    2,608,763
METHOD AND APPARATUS FOR PHOTOGRAMMETRICALLY
CONSTRUCTING TOPOGRAPHICAL MAPS
Filed Sept. 3, 1946    4 Sheets-Sheet 3
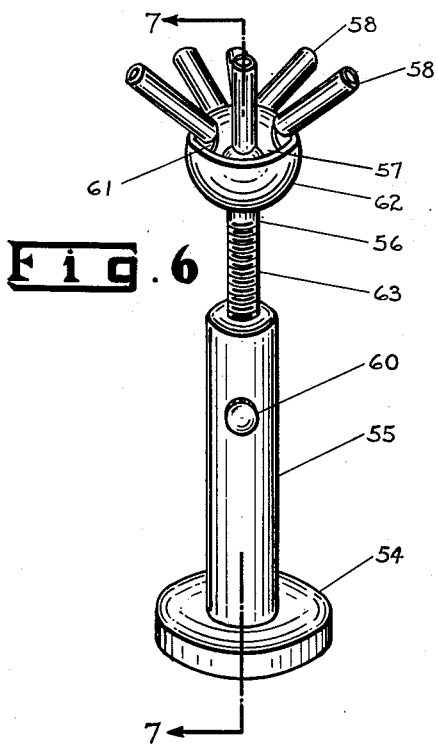
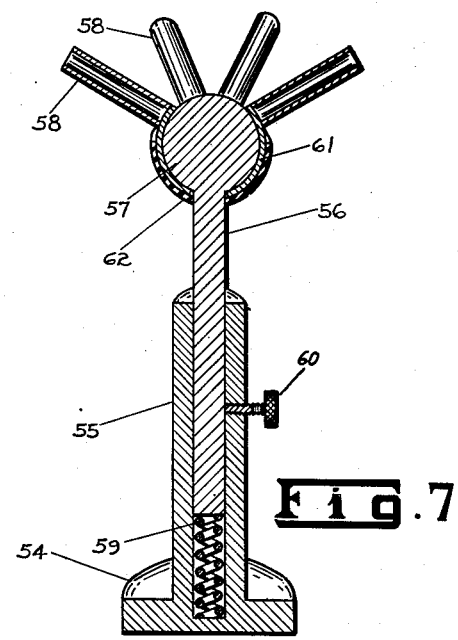
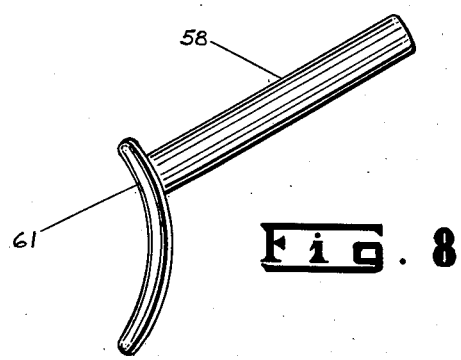
DUDLEY ST. JOHN
INVENTOR.
BY
Huebner, Maltby, & Beehler
ATTORNEYS

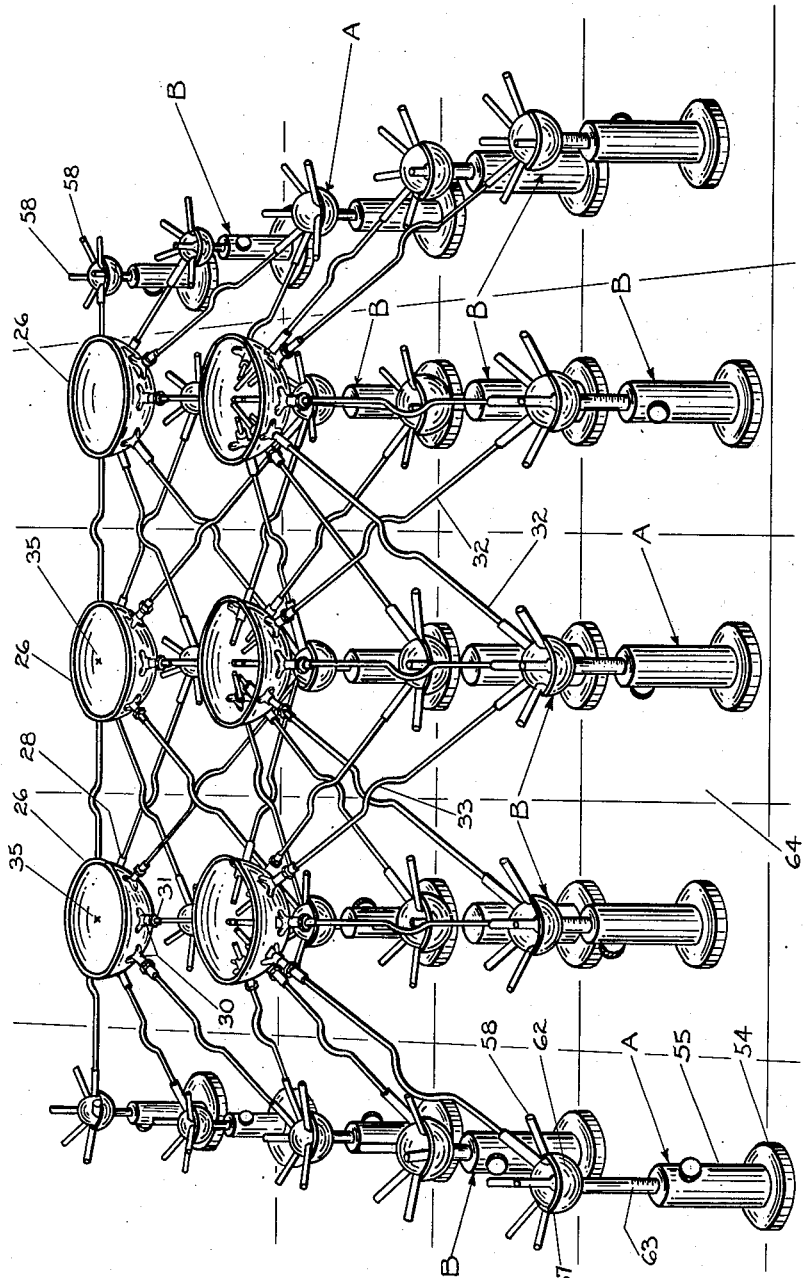

Patented Sept. 2, 1952

2,608,763

UNITED STATES PATENT OFFICE 2,608,763

METHOD AND APPARATUS FOR PHOTO-GRAMMETRICALLY CONSTRUCTING TOPOGRAPHICAL MAPS

Dudley St. John, Fresno, Calif.

Application September 3, 1946, Serial No. 694,623

4 Claims. (Cl. 33—1)

The present invention relates to methods and apparatus for stereophotogrammetrically constructing topographical maps and charts and more particularly to three dimensional triangulation methods and apparatus for accomplishing the same.

Generally, aerial photographic mapping methods comprise the photographing of terrain to be mapped in overlapping individual photographs. Usually, the extent of the overlapping is such as to cause some features of the terrain to appear in six separate photographs; three longitudinally overlapping photographs in each of two parallel and overlapping strips. It is common practice to select an outstanding and readily distinguishable feature near each corner, near the midpoint of each side, and near the center of each photograph for purposes of orientating the individual photographs. These features, whose topographical positions are to be determined, are known as pass points and will be referred to as such in the following description. Once a pass point is selected in one photograph, it is convenient to use the same photographed feature as a pass point in each of the other photographs in which the feature appears.

Further, it is necessary, to the accurate simulation of terrain to be mapped, to have accurate predetermined knowledge of the geographical positions and elevations, either relative or mean sea level, of three or more easily discernible features of said terrain. These features are generally referred to as control points and serve to provide reference means for establishing the position of the pass points and other features photographed. With due regard to the principles of trigonometry, certain other information; such as the location and elevation of one control point, plus the axis of tilt of one of the aerial photographs showing the control point, and the location of the camera at the instant of exposure, may be substituted for the said knowledge of three control points. These other combinations of information sufficient to serve as control means are regarded as trigonometric equivalents. Inasmuch as sufficient data of three or more control points are usually available, the present invention is described in terms of such control points. By so describing the invention, it is to be understood, however, that the present invention is not limited to such knowledge of control points.

Once the overlapping photographs are obtained and the requisite information designating the control points or trigonometric equivalents is known, the problems incident to resolving peripheral distortion and other inconsistencies of the photographs to form an accurate three dimensional map, are of considerable complexity. Several apparatus and methods, such as the "Slotted template method," are successful in the formation of purely two dimensional maps from such aerial photographs where exacting accuracy is not required. The few apparatus and methods directed to the extension of a three dimensional control network by photogrammetric means generally find the pass points in each succeeding photograph by a long trial and error optical process, as opposed to the mechanical solution afforded by the present invention.

An object of my invention is to provide improved stereographic mapping methods and apparatus.

Another object is to provide a method for making topographical maps from overlapping aerial photographs.

Another object is to provide a method of representing features of photographed terrain accurately depicting horizontal and vertical relationships thereof.

Another object is to provide stereophotogrammetrical mapping apparatus adapted for use with aerial photographs for accurately depicting in horizontal and vertical relationship objects or points photographed.

Another object is to provide an apparatus adapted to determine relative positioning of features represented in aerial photographs, to determine their elevations, to reconstruct relative spacial positioning of photographed features and the air-borne camera at each photographic exposure, and to determine the degree and axis of tilt of aerial photographs.

Further objects are to provide improved elements and arrangements thereof in an apparatus of the character and for the purposes set forth.

Fig. 1 is a schematic perspective view of terrain included in overlapping photographs indicating camera lens positions, sighting rays, control points and pass points.

Fig. 2 is a further schematic view illustrating reconstructed sighting rays, also referred to as sight lines, applied to graphically presented control points in the determination of the locations of spacially related pass points.

Fig. 6 is a side elevation of a modified point post of the present invention.

Fig. 7 is a vertical section taken on line 7—7 of Fig. 6.

Fig. 8 is an enlarged perspective view of a spherometer tube and mounting plate.

Fig. 9 is a composite perspective view illustrating the employment of reconstructed sight lines in the formation of three dimensional maps and charts.

Figure 3:
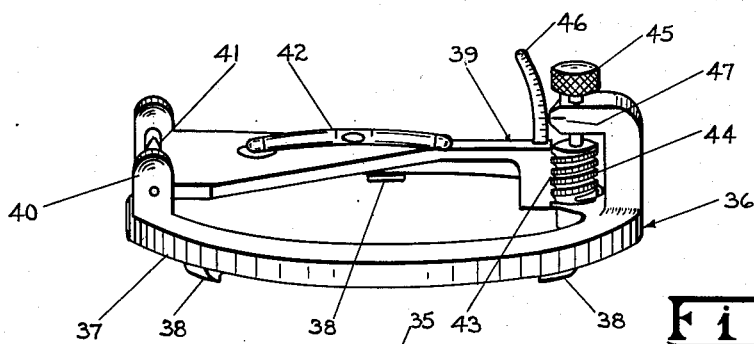
Fig. 3 is a side elevation of an apparatus for reconstructing sight lines from photographs; a portion thereof being broken away to reveal radial tubes, rods, and clamping means; and showing a device for measuring the direction and extent of tilt of said apparatus.

Referring in greater detail to the drawings:

In Fig. 1 a schematic perspective view is employed to illustrate, in simplified form, the problems involved in three dimensional mapping and the solutions provided by the present invention. A portion of terrain to be mapped is illustrated generally at 10. Portions of said terrain included in each of a series of photographs are indicated by areas inscribed by each of the successive squares 11, 12, and 13. Respective camera lens positions for the photographs of areas encompassed by the squares are indicated at 14, 15, and 16. Exaggerated positions for the photographic films at their instants of exposure are shown at 17, 18, and 19, respectively.

It is to be noted that, although the terrain is generally photographed in overlapping parallel strips of successively overlapping photographs so as to image features of the terrain on six separate photographs, as has been described, Fig. 1 indicates only three overlapping photographs for simplification of illustration. Three photographs are generally sufficient to locate pass points revealed in each photograph and two are even sufficient under certain circumstances. Multiplying the number of overlapping photographs increases the opportunities for cross checking in the establishment of pass point location and is conducive to increased accuracy.

Within the photographed area 11, a steeple 20 and the center of a tank 21, whose horizontal positions and elevations are predetermined as by ground survey, exemplify control points. Also within area 11, typical pass points whose positions and elevations are to be determined, are represented by the peak of a windmill 22 and the top of a distinctive tree 23.

The area 12 embraces the control point 21, the pass point 23 and another control point, the top of the silo 24, whose horizontal positions and elevation are also predetermined.

The area 13 includes the control points 21, 24, the pass point 23, and an additional pass point, a distinctive rock 25.

Images of the control points and pass points are indicated on the films by their respective numbers followed by the letter i. Control point sight lines are shown in dashed lines extending from their terrain positions to their respective images and are designated by their terminal numbers, as 20—20i. Similarly, the pass point sight lines are designated by their terminal numbers, as 22—22i. The pass point sight lines are shown in lines of alternate dots and dashes. The pass point sight lines and the control point sight lines are further referred to as object portions extending from their respective points on the terrain to a respective lens, as 20—14 for example, and image portions extending from the lens to a respective image, as 14—20i.

For purposes of illustration, let it be imagined that the sight lines have substance, are rigid, and are in fixed angular relation for each photograph. Further, for purposes of preliminary consideration it is assumed that the lengths of the object sight lines are known. Later it will become apparent that this information is not prerequisite to the employment of the methods or apparatus of the present invention.

By definition, the positions and elevations of the control points are known. Being known, it is a simple matter graphically to plot either their relative or absolute spaced relationship. In Fig. 2, the control points 20', 20' and 24' are so positioned as simulations of the control points 20, 21, and 24, according to any convenient scale.

The problem of locating the pass points in spaced relation to the control points is primarily one of reconstructing the sight lines indicated in Fig. 1. To accomplish this, the bipod formed by the object sight lines 20—14 and 21—14 has its respective sight lines proportionately reduced to agree with the scale of the plot of Fig. 2 and their lower end portions positioned on the plotted simulated positions of the control points 20' and 21'. There being only two predetermined points known to establish the position of the said bipod, said bipod may be thought of as being pivoted at points 20' and 21'. The pass point object sight line 23—14, being in fixed angular relation will generate a surface, as the said bipod is pivoted. The surface so generated is a surface of position of the simulated pass point 23'.

The bipod formed by the object lines 21—15 and 24—15 has its legs similarly proportionately reduced to agree with the plotting scale of Fig. 2, and is positioned with the lower ends of the object lines pivoting on the simulated control points 21' and 24'. The pass point object sight line 23—15, being in fixed angular relation to said bipod, similarly sweeps out a surface of positions for the simulated pass point 23'. The intersection of the two surfaces of position for the simulated pass point 23' delineates a line of position for the pass point as shown.

To determine the point on the line at which the simulated position of pass point 23' should fall, the bipod 21—16—24 has its legs proportionately scale to agree with the plot of Fig. 2 and is pivotally associated with the simulated control points 21' and 24', as described. By pivoting said bipod and pass point object sight line 23—16, angularly related thereto, a surface of position for said simulated pass point 23' is generated. It will now be seen that the simulated pass point 23 has three intersecting planes of position. Their common point of intersection determines the proper simulated position of said pass point in three dimensional spaced relation to the plotted control points.

To determine the proper simulated position for the pass point 25', the tripod formed by the object sight lines 21—16, 23—16 and 24—16 serves to position the object sight line 25—16, which is in fixed angular relation thereto. Thus 25—16 becomes a line of position for the simulated pass point 25'. The intersection of said line of position with the surface of position already generated therefor, spacially positions simulated pass point 25' in proper relation to the control points. It will readily be observed that progressive determination of the pass points permits the development of a three dimensional map of the terrain common to overlapping photographs. Although a line of position for the pass point 22 can be generated, the exact location thereof cannot be determined by the methods of the present invention for it lies in only one of three photographs.

Further, it is evident that by increasing the number of sight lines employed for each photograph, by multiplying the number of photographs involved, and by increasing the extent of the overlapping of the photographs the corradiate sight lines from each photograph will form an integrated network three dimensionally positioning the pass points involved. Although the illustration was built up from a knowledge of certain control points, it is now apparent that said control points served merely to determine a scaled positioning and a plane of reference. Without control points, said evolved network of integrated object sight lines relatively positions the pass points by the intersection of two or more of the sight lines, albeit the entire network may be tilted without any plane of reference to orientate it. It follows, therefore, that knowledge of three unaligned control points scattered widely over the mapped terrain are sufficient to determine a plane of reference and scale of positioning for any number of pass points involved.

Further, it was assumed that lengths of the object sight lines were known for the purpose of providing a readily describable delineation of planes of position for object control point sight lines and object pass point sight lines. When dealing not with bipods but with units involving a multiplicity of corradiant object sight lines and a multiplicity of integrated units having object sight lines leading to common pass points and/or control points, it is obvious that the lengths of the object sight lines need not be known. The points of radiation are positioned relative to each other and to the simulated control points by visual reference. As more and more sight lines are employed emanating from a plurality of points of radiation and involving common control points and pass points; said control points, pass points, sight lines and points of radiation must seek their proper relative positions as the integration thereof progresses.

The angles formed by the image sight lines are equal to the angles formed by their respective object sight lines, since each image sight line is an extension of each object sight line and corresponding interior angles are equal. For example:

$$\angle 20i-14-21i = \angle 20-14-21$$

Since the described procedure for making a topographical map from reconstructed object sight lines involved only angular relationships, the same general procedure may be followed in developing topographical maps by reconstructing the image sight lines. Inasmuch as it is much more convenient to reconstruct image sight lines by working directly from photographs, the subsequent description of the methods and apparatus of the present invention deals with the reconstruction and use of image sight lines as obtained from photographs.

Figure 4:
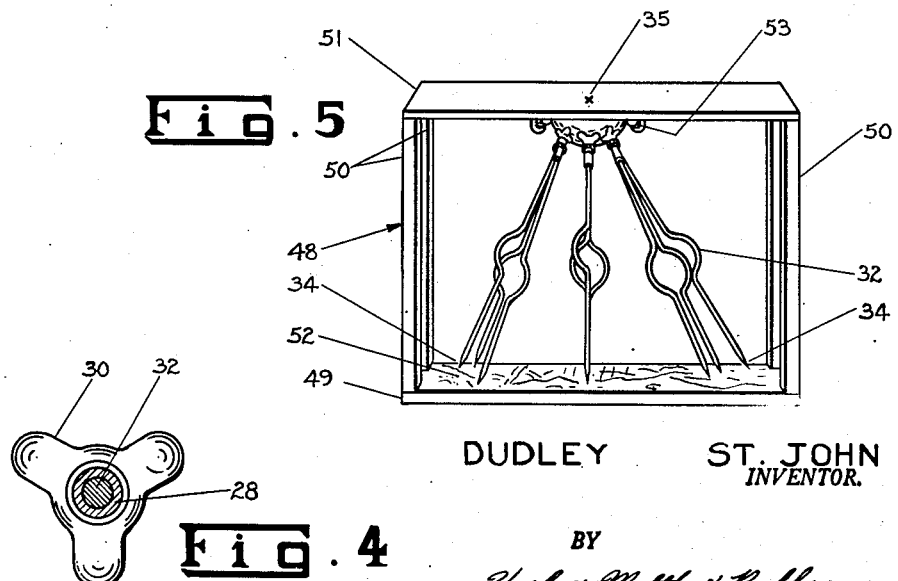
Fig. 4 is an enlarged view of an external tripod clamp taken on line 4—4 of Fig. 3.

In Fig. 3, a hollow hemispherical mounting member 26 is illustrated as a convenient device for the reconstruction of sight lines from photographs. The mounting member has enlarged opening 27 formed therein. Tubes 28 are passed through the openings in radial relation to the mounting member. Clamping means are positioned on the tubes and engage the internal and external surfaces of the mounting member to secure said tubes radially to the mounting member. The clamping means comprise an inner tripod jaw 29, as shown in Figs. 3 and 4, mounted fixedly on each tube in circumjacent relation thereto and having mounting member engaging surfaces in a plane preferably at right angles to the longitudinal axis of said tube. Said inner jaws are secured to the tubes as by being sweated thereon. Outer tripod jaws 30 are slidably positioned or their respective tubes and knurled securing nuts 31 are screw-threadably engaged to the tubes and serve to draw the inner and outer jaws against the mounting member.

Stylus rods 32 are frictionally engaged in the tubes 28 and are aligned therewith. Said rods have offset portions 33 to permit their arrangement for minimal interference with stylus rods from other photographs involving common pass points and control points when the mounting members and associated elements are arranged in the construction of three dimensional maps. The stylus rods have pointed lower end portions 34 to facilitate their accurate positioning on photographic features comprising control points and pass points. Hereinafter the word "lineal" is used as meaning a combination of rod and tube or any other structural member or combination of members fixed in all dimensions but length and telescopically adjustable as to length while maintaining alignment of associated portions thereof.

The three clamping surfaces of each of the inner jaws 29 and each of the outer jaws 30 are so related to the tubes 28, that when they engage the mounting member 26, the tubes and stylus rods are aligned with the center of said mounting member. The center of each mounting member thus comprises a radiation point for the tubes and rods and is indicated at 35. The openings 27 are preferably of a size, shape, and relative location as to permit the lower end portions of the stylus rods to traverse the nine areas of each photograph in which pass points and control points are usually selected, as previously described, when the radiation point for each mounting member is held a distance from a photograph equal to the focal length of the camera lens that made the photograph.

The device for determining the direction and extent of tilt of the mounting member 26 is indicated generally at 36, elevated above its operating position. A base portion 37, thereof, normally rests on the upper edge of the mounting member 26 and is free to be rotated thereon. Three or more lip elements 38 engage the upper edge portion of the mounting member and constrain the base to positions on said mounting member as it is rotatably positioned thereon. A leveling element 39 is pivotally mounted on the base portion by a hinge 40. The hinge is preferably arranged to constrain pivotal movements of the leveling element to a plane in right angle relationship to the upper edge portion of the mounting member 26. A spirit level 41 is borne by the leveling element in parallel relation to the pivoting axis of the hinge. A second spirit level 42 is mounted on the leveling element in right angle relationship to said hinge pivoting axis. A rack gear 43 is formed on the movable end of the leveling element. A worm gear 44 is rotatably mounted on the base portion 37 in engagement with the rack gear and for convenience in operation is provided with a knurled head 45. A protractor scale 46 is provided on the leveling element in association with an indicator 47 of the base portion 37 to measure angular relationships between the two. The base portion 37 and supported elements are removable from the mounting member at will by merely lifting the same therefrom.

Figure 5:
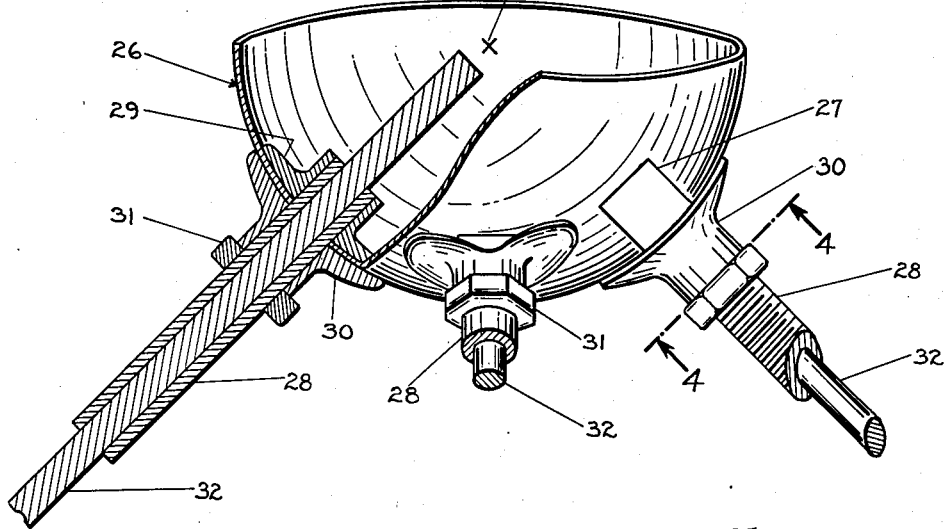
Fig. 5 is a perspective view of a hemispherical mounting member, a positioning frame and aerial photograph as employed to reconstruct sight rays of a photograph.

In Fig. 5 a positioning frame 48 for holding any desired number of mounting members, of the type shown at 26, and elements borne thereby, exclusive of the tilt measuring device, is shown. The frame comprises a base 49, uprights 50, and a top portion 51. The base 49 and top portion 51 are preferably parallel and spaced apart a distance equal to the focal length of the lens of a camera whose sight lines for a particular photograph are to be reconstructed. Such a photograph 52 is positioned on the base 49 and a mounting member and associated elements is secured to the top portion 51 in a relation to the photograph causing the radiation point 35 substantially to coincide with the perspective center of the photograph. The mounting member is secured to said top portion as by means of spring loaded catches 53.

So mounted, the sight lines of the photograph 52 are reconstructed by aligning the stylus rods with selected control points and pass points of the photograph and the radiation point 35 of the mounting member; securing the tubes holding said rods in adjusted, angular, radiant relation by tightening the clamping means; and sliding the stylus rods 32 longitudinally in the tubes 28 until their pointed lower end portions 34 coincide with said selected pass points and control points of the photograph. So adjusted, the mounting member and associated elements are removed from the positioning box, labeled to agree with the photograph 52 and laid aside until similar reconstruction of sight lines has been accomplished for the other photographs of the terrain to be mapped.

A modified form of point post, as provided by the present invention, is illustrated in Figs. 6 and 7. The point post comprises a base 54; a hollow cylindrical pedestal 55 mounted thereon; a support shaft 56 telescopically engaged in the hollow cylindrical pedestal in an upright position, a sphere 57 borne by the upwardly extended end portion of the shaft; tubes 58 radially extended from the sphere and angularly adjusted in relation to each other; a resilient means, such as a helical compression spring 59 in the pedestal exerting an upward force on the shaft substantially equal to its weight and the weight of the supported elements, and a screw-threaded means 60 in the pedestal for locking the shaft in adjusted elevational position.

In Fig. 8, the means are shown for mounting the tubes 58 on the sphere 57 so that they are individually adjustable but constrained to radial positions relative to the sphere. Said means comprise convex-concave plates 61 shaped to conform to the exterior of the sphere, mounting the tubes 58 radially on their convex surfaces and an elastic envelope 62 resiliently constraining the concave surfaces of said plates in engagement with the sphere but permitting adjustable positioning of the same thereon. The number of tubes radiating from each point post may be increased or decreased at will by inserting additional plates between the envelope and sphere or removing the same therefrom. Graduations 63 are preferably provided on the shaft 56 for convenience in measuring the elevation of the center of the sphere above the bottom surface of the base 54.

A mapping board 64, indicated in Fig. 9, has cardinal and ordinal lines plotted thereon according to any selected scale. It has been found convenient to choose the cardinals and ordinals to represent latitude and longitude of the terrain to be mapped. Control points are accurately plotted thereon. Point posts are placed on each control point and the spheres thereof elevated so that the centers of each sphere accurately depict the elevations of the control points in the same scale as employed horizontally on the mapping board. Such point posts are indicated by the letter A in Fig. 9.

Additional point posts B are arranged on the mapping board in approximate pass point location by visual reference to photographs of the terrain being mapped.

Attention is again had to the mounting members 26 and their associated elements embodying the reconstruction of photographic sight lines, as previously described. Such a mounting member, having a stylus rod 32 positioned by a photographed control point is held in a position in relation to the sphere of a control point post A approximating the position the camera was in relation to the control point photographed at the instant of exposure. The stylus rod representing the reconstructed control point sight line is inserted into a tube 58 radiating from the control point post. Other stylus rods 32 emanating from the mounting member in question are inserted in tubes borne by their respective pass point and control point posts. Another mounting member bearing associated elements arranged in sight line construction positions, is selected and the same procedure followed. Care is taken never to displace the control point posts A nor to alter the elevational positions of their spheres nor to alter the angular relationships of the reconstructed sight lines emanating from a single mounting member. As more and more of the reconstructed sight lines are brought to bear on their respectice control points and pass points, represented by the centers of the spheres of the point posts A and B, it is frequently found necessary to horizontally re-position the pass point posts B and readjust the elevational positions of their spheres. It is to be understood that this horizontal and elevational re-positioning of the spheres of the pass point posts is in large measure responsive to the insertion of the stylus rods in the tubes 28 and comprises an automatic readjustment of position. It is further found necessary to slide the stylus rods 32 longitudinally in their engaged tubes 28 and 58 to adjust to the scale being employed. As the number of reconstructed sight lines is increased, interference between stylus rods occasionally takes place. When such occurs, the offset portions thereof are adjusted to permit said stylus rods to pass each other without interference.

The methods of the present invention and the operation of the apparatus as provided are apparent from the preceding description but will be briefly summarized at this point. The steps involved in the constructing of three dimensional maps from a plurality of overlapping photographs are briefly these:

First, in each photograph, reconstructed sight lines are established radiating from the perspective centers of the photographs through the images of various predetermined control points as by orienting a mounting member above each photograph in such a position that its perspective center is coincident with the perspective center of the photograph and arranging and securing the tubes and stylus rods to point at predetermined control points and selected pass points on the photographs.

Second, the control points are graphically represented in three dimensional relationship, as by control point post spheres elevated above a mapping board to scalularly indicate the longitude, latitude, and elevation of said control points.

Third, the mounting members and angularly related stylus rods comprising reconstructed photographic sight lines are applied to the graphically presented control points so that the radiation points of each relate to said simulated control points as the camera lenses at the instants of photographic exposure related to the actual control points.

Fourth, the map positions for the simulated pass points are determined in three dimensional relation to the simulated control points by the intersection of two or more reconstructed sight lines determined from the several images of the pass point in overlapping photographs. This step mechanically locates a secondary triangulation net somewhat as slotted templet assemblies do, but differing therefrom in at least two respects: it solves for elevation, and it provides a true horizontal solution irrespective of individual or collective photographic tilt.

The elevations of the pass points may be read from the graduations 63. Longitude and latitude of each pass point is represented by the center of the base of the respective pass point posts on the map projection. The radiation points for each set of stylus rods in each mounting member represent respective camera stations at instants of photographic exposure.

The amount each mounting member is tilted is the tilt of each photograph. The tilt measuring device is conveniently employed to measure said displacement from the horizontal accurately. It is placed on the upper edge portion of the mounting member 26 whose photographic tilt is to be measured with the lip elements 38 engaging the sides of said mounting member. The tilt measuring device is rotated until the level 41 assumes a horizontal position indicating the pivoting axis of the hinge is also horizontal. The worm gear 44 is manipulated by means of its knurled head 45 until the second level 42 indicates that the leveling element 39 is in a horizontal plane. So adjusted, the extent of photographic tilt is read directly from the protractor scale 46. The direction of tilt is the direction the second level points from the hinge. A line perpendicular to the adjusted leveling element and passed through the radiation point for the stylus rods 32 and the tubes 28 is the simulated plumb line.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. A three dimensional mapping method comprising substituting freely sliding lineals for sight lines from a plurality of displaced perspective centers to control points and pass points, graphically positioning simulated control points in three dimensional spaced relation at any scale, maintaining the lineals emanating from each perspective center in constant angular relation to each other, applying the lineals for the control points to the graphically positioned simulated control points, and integrating the lineals from a plurality of perspective centers to graphically position simulated pass points relative to said graphically positioned simulated control points by the constrained intersection of a plurality of lineals for each simulated pass point.

2. A method of finding the positions and elevations of points imaged on several of a plurality of overlapping photographs of terrain in which the positions and elevations of three or more control points are known, comprising reconstructing photographic sight lines of the control points and pass points in fixed angular relationship to each other as they existed at the exposure of each photograph, the group of lineals radiating from each center being angularly fixed in relation to each other by constraining the axis of each lineal relating to a photograph to pass through the perspective center of the photograph and through the image of a pass point or control point or by constraining the axis of each lineal relating to a photograph to be held so the same angular relationship to the other lineals relating to that photograph exists as would if each were passed through the perspective center and the image of a control point or pass point, plotting simulated control points on a mapping board, elevating the simulated control points by the same scale as employed on the plot of the mapping board, applying the control point lineals to the simulated control points, constraining related pass point lineals to intersect at common points, and determining the positions for simulated pass points by measuring the position and elevation of said common points.

3. A method of finding camera positions, attitudes, and pass point positions from a plurality of overlapping photographs of terrain in which geographical positions and elevations of three or more control points are known comprising reconstructing sight lines as freely telescopic lineals emanating from perspective centers of the photographs through the images of the control points and selected pass points, plotting the simulated positions of the control points in three dimensional relation, applying the control point lineals to the simulated control points, constraining the several lineals relating to each pass point to intersect while maintaining constant angular relationships of said lineals having common perspective centers and determining the relative positioning of simulated pass points and camera positions in relation to the simulated control points by measuring the positions and heights of the intersections of their respective lineals, and determining the attitude of the camera at each instant of exposure by measuring the tilt of the pyramid of lineals at each perspective center compared to the inclination of the corresponding pyramid of sight lines on the level photograph.

4. A mapping device adapted to recapture the positions and attitudes of a camera at the instants of exposure and to find the positions of pass points given a plurality of overlapping photographs on which appear the images of at least three known control points comprising hollow, hemispherically shaped mounting members; tubes adjustably securable to the mounting members only in such a manner that whatever the angular relations between tubes clamped to the same mounting member, the axes of all said tubes intersect at the center of the sphere comprising the outer surface of the mounting member; stylus rods slidably engaged in said tubes; support frame means for positioning the mounting members above the photographs, a distance substantially equal to the focal length of the camera lens involved in the making of each photograph, while the tubes and rods are employed to reconstruct photographic sight lines, a mapping board for plotting horizontal control point positions, vertically adjustable control point posts topped with multiple armed universal joints for establishing elevational positions of control points above the mapping board, freely movable and freely elevatable pass point posts also topped with multiple armed universal joints whereby said stylus rods representing sight lines from a plurality of photographs may be constrained by fitting into the arms of the corresponding universal joints so that the axes of all lineals to a single control or pass point meet at some common point, said common point, if a control point, being fixed at its correct position and elevation.

DUDLEY ST. JOHN.

REFERENCES CITED

The following references are of record in the file of this patent:

UNITED STATES PATENTS

| Number | Name | Date |
|---|---|---|
| 431,036 | Dawson | July 1, 1890 |
| 510,758 | Adams | Dec. 12, 1893 |
| 763,962 | Clayton et al. | July 5, 1904 |
| 942,580 | McGregor et al. | Dec. 7, 1909 |
| 1,045,684 | De Arment | Nov. 26, 1912 |
| 1,133,598 | Winslow | Mar. 30, 1915 |
| 1,216,133 | Kammerer | Feb. 13, 1917 |
| 1,278,148 | Heusser | Sept. 10, 1918 |
| 1,331,978 | Brock et al. | Feb. 24, 1920 |
| 1,570,581 | Stuart | Jan. 19, 1926 |
| 1,713,498 | Cooke | May 14, 1929 |
| 1,782,660 | Meyer | Nov. 25, 1930 |
| 1,793,217 | Fourcade | Feb. 17, 1931 |
| 1,896,998 | Bennett | Feb. 7, 1933 |
| 1,937,711 | Nelles et al. | Dec. 5, 1933 |
| 1,980,981 | Cooke | Nov. 20, 1934 |
| 2,166,650 | Townsend | July 18, 1939 |
| 2,253,677 | Berchtold | Aug. 26, 1941 |
| 2,377,949 | McMenamy | June 12, 1945 |
| 2,404,243 | Moynihan | July 16, 1946 |

FOREIGN PATENTS

| Number | Country | Date |
|---|---|---|
| 153,586 | Austria | June 10, 1938 |
| 306,384 | Germany | July 20, 1921 |
| 355,669 | Germany | June 29, 1922 |
| 514,479 | France | Nov. 15, 1920 |
| 564,859 | France | Oct. 30, 1923 |